(12) United States Patent  
Teranishi

(10) Patent No.: US 10,942,386 B2  
(45) Date of Patent: Mar. 9, 2021

(54) DISPLAY DEVICE

(71) Applicant: Japan Display Inc., Tokyo (JP)

(72) Inventor: Yasuyuki Teranishi, Tokyo (JP)

(73) Assignee: Japan Display Inc., Tokyo (JP)

(*) Notice: Subject to any disclaimer, the term of this patent is extended or adjusted under 35 U.S.C. 154(b) by 14 days.

(21) Appl. No.: 16/394,852

(22) Filed: Apr. 25, 2019

(65) Prior Publication Data  
US 2019/0331952 A1 Oct. 31, 2019

(30) Foreign Application Priority Data  
Apr. 26, 2018 (JP) .............................. JP2018-085304

(51) Int. Cl.
| | | |
|---|---|---|
| G02F 1/1333 | (2006.01) | |
| G02F 1/1345 | (2006.01) | |
| G06F 3/044 | (2006.01) | |
| G06F 3/041 | (2006.01) | |
| G02F 1/1343 | (2006.01) | |

(52) U.S. Cl.  
CPC ...... G02F 1/13338 (2013.01); G02F 1/13458 (2013.01); G06F 3/0412 (2013.01); G06F 3/0445 (2019.05); G06F 3/0448 (2019.05); G06F 3/04164 (2019.05); *G02F 1/134363* (2013.01); *G02F 2201/56* (2013.01); *G02F 2202/28* (2013.01)

(58) Field of Classification Search  
USPC ........................................................ 345/174  
See application file for complete search history.

(56) References Cited

U.S. PATENT DOCUMENTS

| | | | | |
|---|---|---|---|---|
| 2016/0139733 | A1* | 5/2016 | Noguchi | G06F 3/0445 |
| | | | | 345/174 |
| 2017/0220163 | A1* | 8/2017 | Kurasawa | G06F 3/0412 |
| 2018/0031934 | A1* | 2/2018 | Watanabe | G02F 1/136213 |
| 2018/0033800 | A1* | 2/2018 | Koide | G06F 3/0445 |
| 2018/0035541 | A1* | 2/2018 | Kamijo | G02F 1/136227 |
| 2018/0067599 | A1* | 3/2018 | Cai | G06F 3/0448 |
| 2018/0120988 | A1* | 5/2018 | Kim | G06F 3/0412 |
| 2018/0213638 | A1* | 7/2018 | Osawa | G02F 1/13338 |
| 2018/0348929 | A1* | 12/2018 | Rhe | G06F 3/04164 |
| 2020/0104014 | A1* | 4/2020 | Gong | G06F 3/0448 |

FOREIGN PATENT DOCUMENTS

| | | | |
|---|---|---|---|
| CN | 107291303 A | * | 10/2017 |
| JP | 2014-95968 A | | 5/2014 |

* cited by examiner

*Primary Examiner* — Chineyere D Wills-Burns  
(74) *Attorney, Agent, or Firm* — K&L Gates LLP

(57) ABSTRACT

According to one embodiment, a display device includes a first substrate, a second substrate and an adhesive layer. The first substrate includes drive electrodes arranged at a first intervals in a first direction. The second substrate is opposed to the first substrate and includes detection electrodes arranged at a second intervals in a second direction perpendicular to the first direction. The adhesive layer bonds the first substrate and the second substrate together. A first detection electrodes of the detection electrodes are shaped in accordance with a shape of a display area which displays an image.

12 Claims, 11 Drawing Sheets

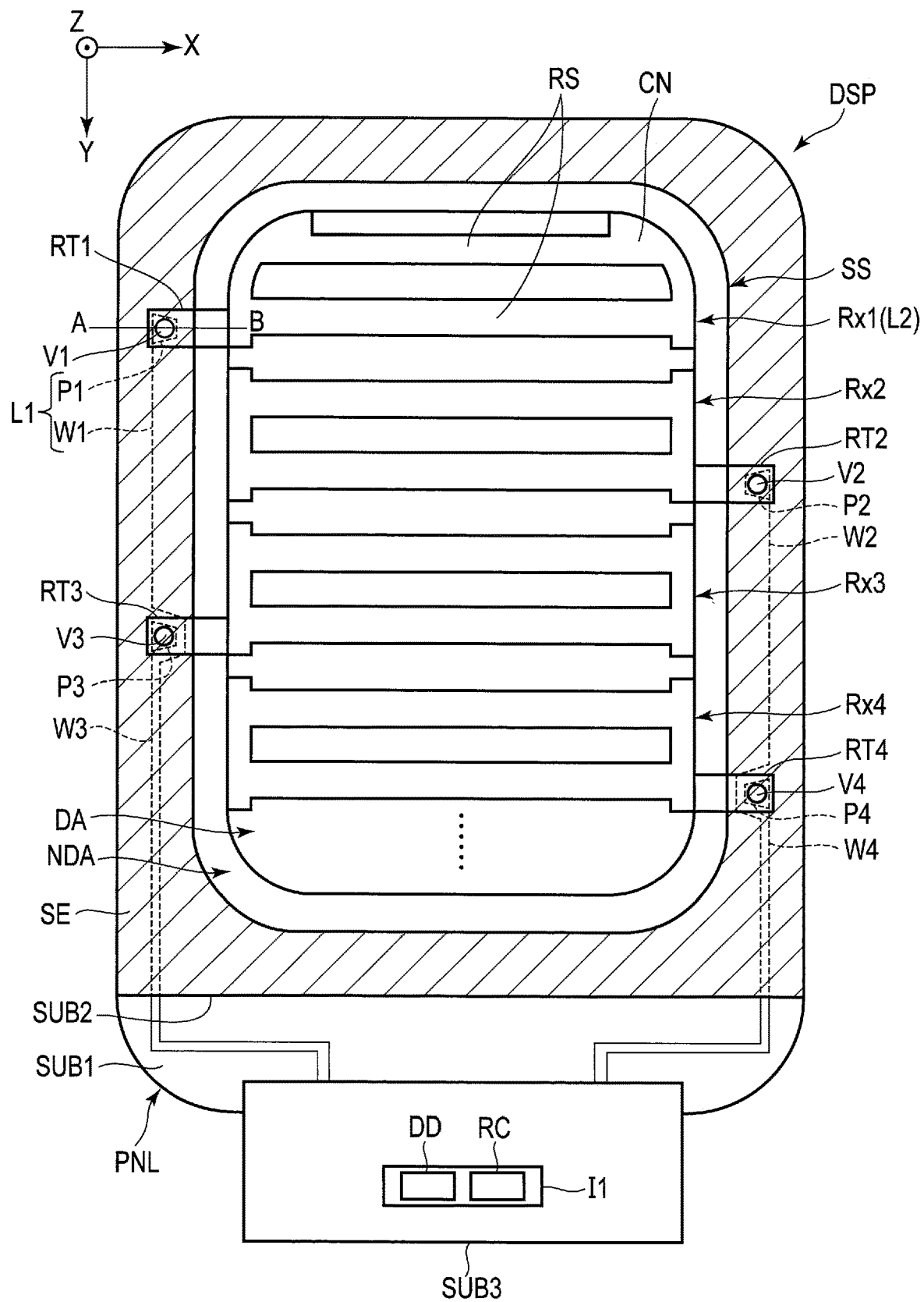
F I G. 1

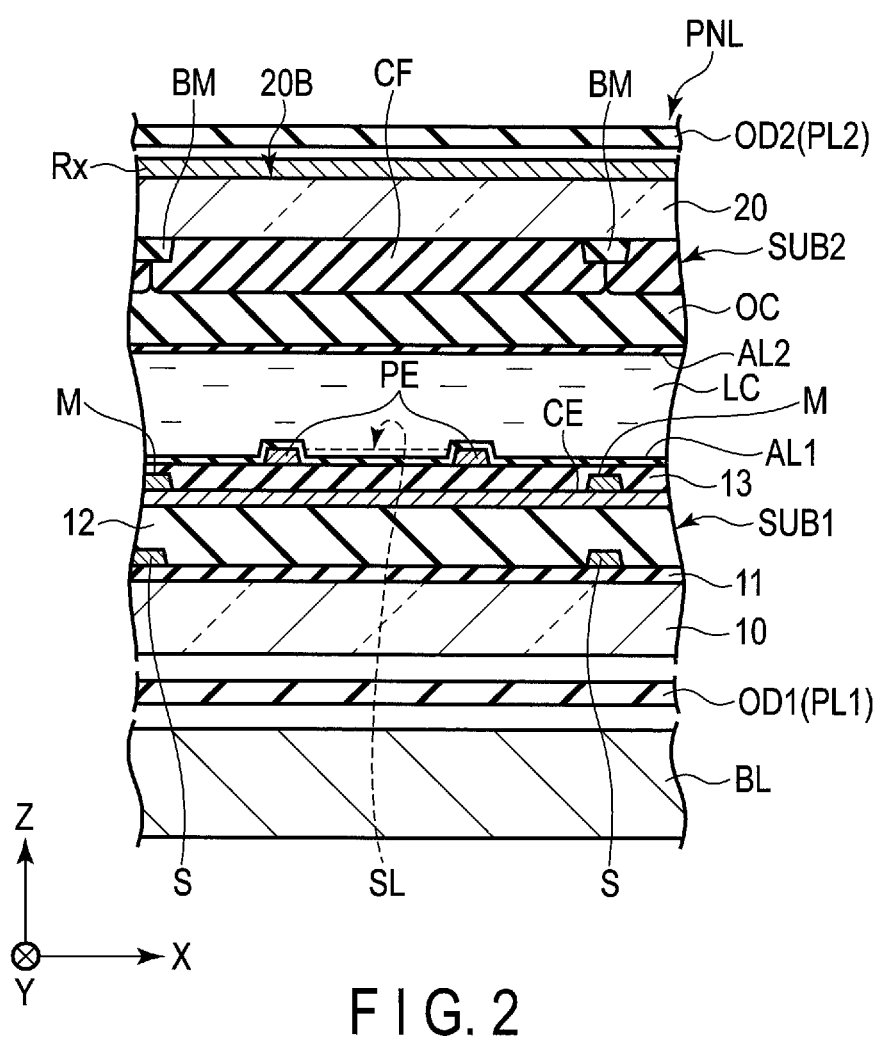
F I G. 2

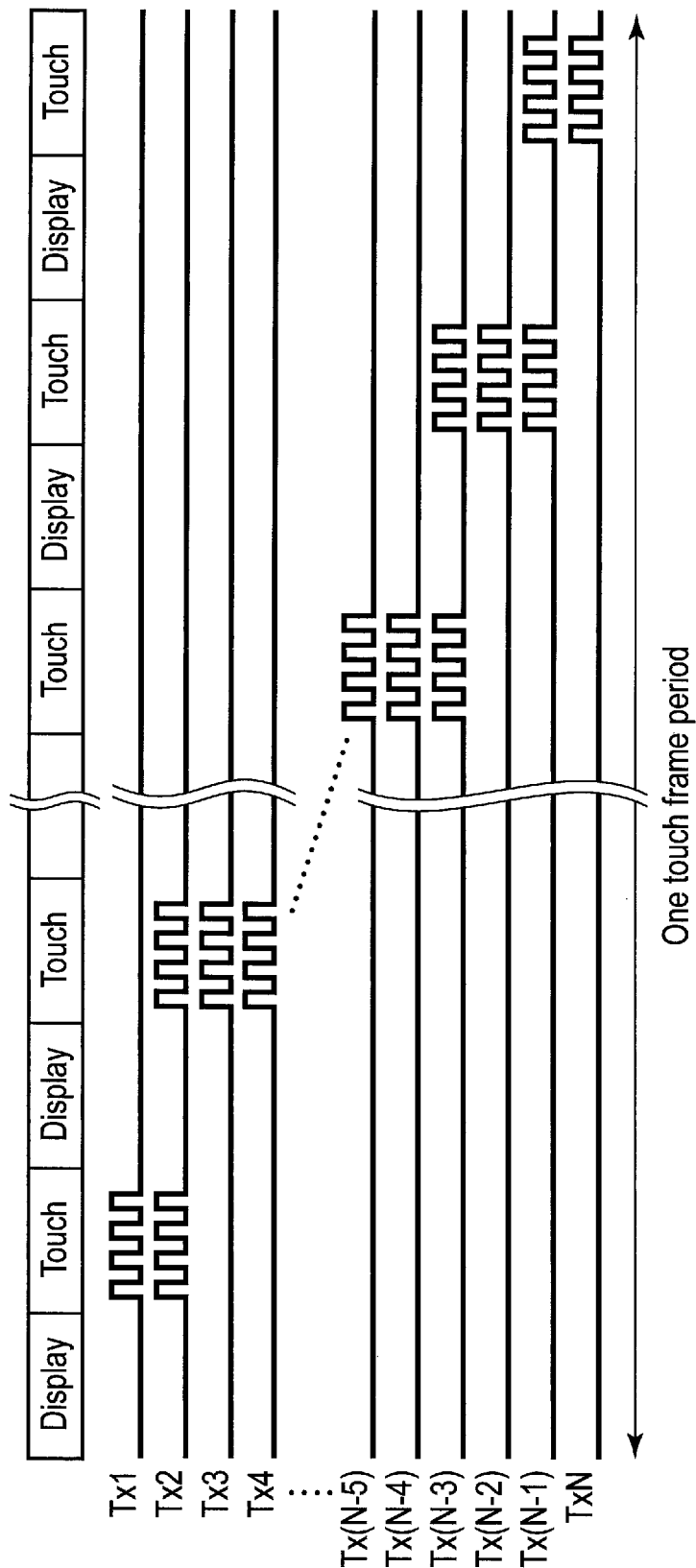
F I G. 5

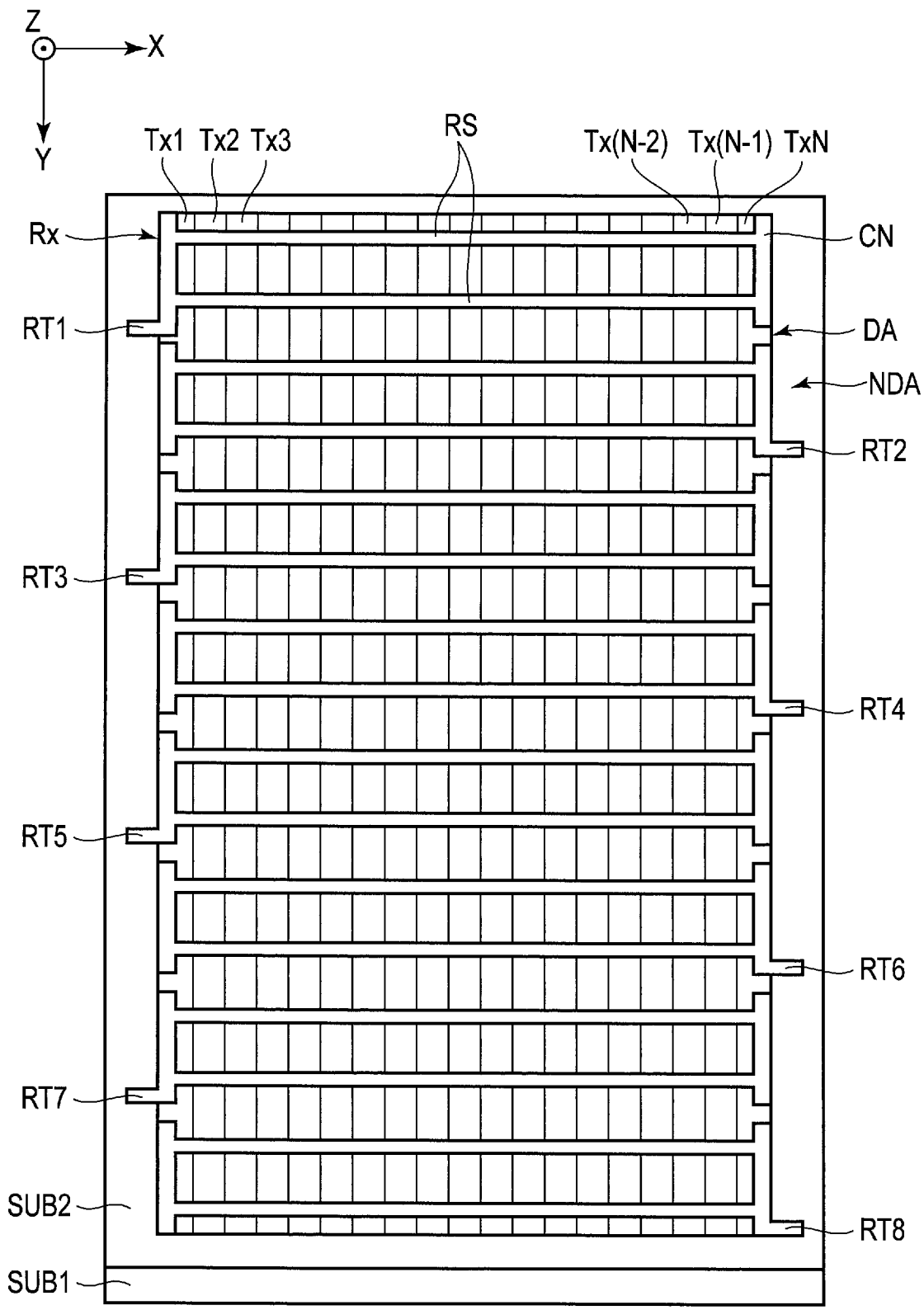
F I G. 6

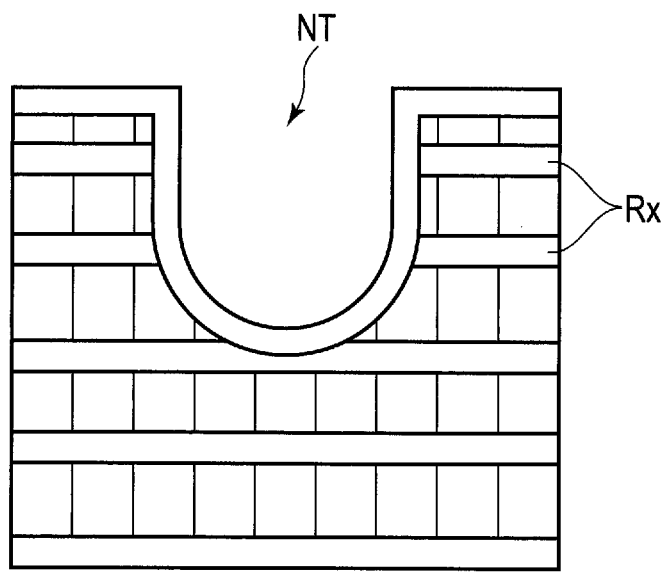
F I G. 10
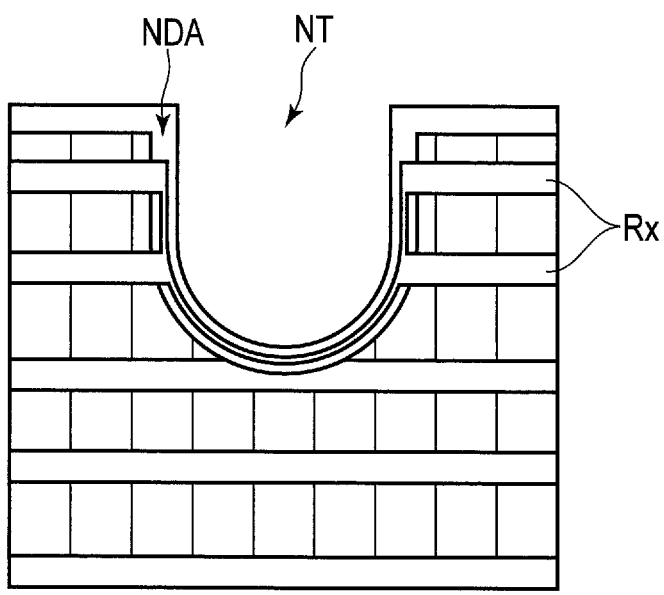
F I G. 11

DISPLAY DEVICE

CROSS-REFERENCE TO RELATED APPLICATIONS

This application is based upon and claims the benefit of priority from Japanese Patent Application No. 2018-085304, filed Apr. 26, 2018, the entire contents of which are incorporated herein by reference.

FIELD

Embodiments described herein relate generally to a display device.

BACKGROUND

Recently, as part of techniques for narrowing the frame of a display device, various techniques for making a display device have a shape other than a rectangular shape have been considered. For example, various techniques for making a display device have a round shape have been proposed.

SUMMARY

The present application relates generally to a display device.

According to one embodiment, a display device includes a first substrate, a second substrate and an adhesive layer. The first substrate includes drive electrodes arranged at a first intervals in a first direction. The second substrate is opposed to the first substrate and includes detection electrodes arranged at a second intervals in a second direction perpendicular to the first direction. The adhesive layer bonds the first substrate and the second substrate together. A first detection electrodes of the detection electrodes are shaped in accordance with a shape of a display area which displays an image.

BRIEF DESCRIPTION OF THE DRAWINGS

FIG. 1 is a plan view showing a configuration example of a display device according to one embodiment.

FIG. 2 is a cross-sectional view showing the structure of a part of a display panel according to the embodiment.

FIG. 5 is a timing chart showing an example of a mutual-capacitive sensing operation.

FIG. 6 is a plan view showing a configuration example of a generally-used display device.

FIG. 10 is an illustration showing an example of the shape of a detection electrode in a case where the display device according to the embodiment has a notch.

FIG. 11 is an illustration showing an example of the shape of a detection electrode in a case where the display device according to the embodiment has a notch.

DETAILED DESCRIPTION

Figure 3:
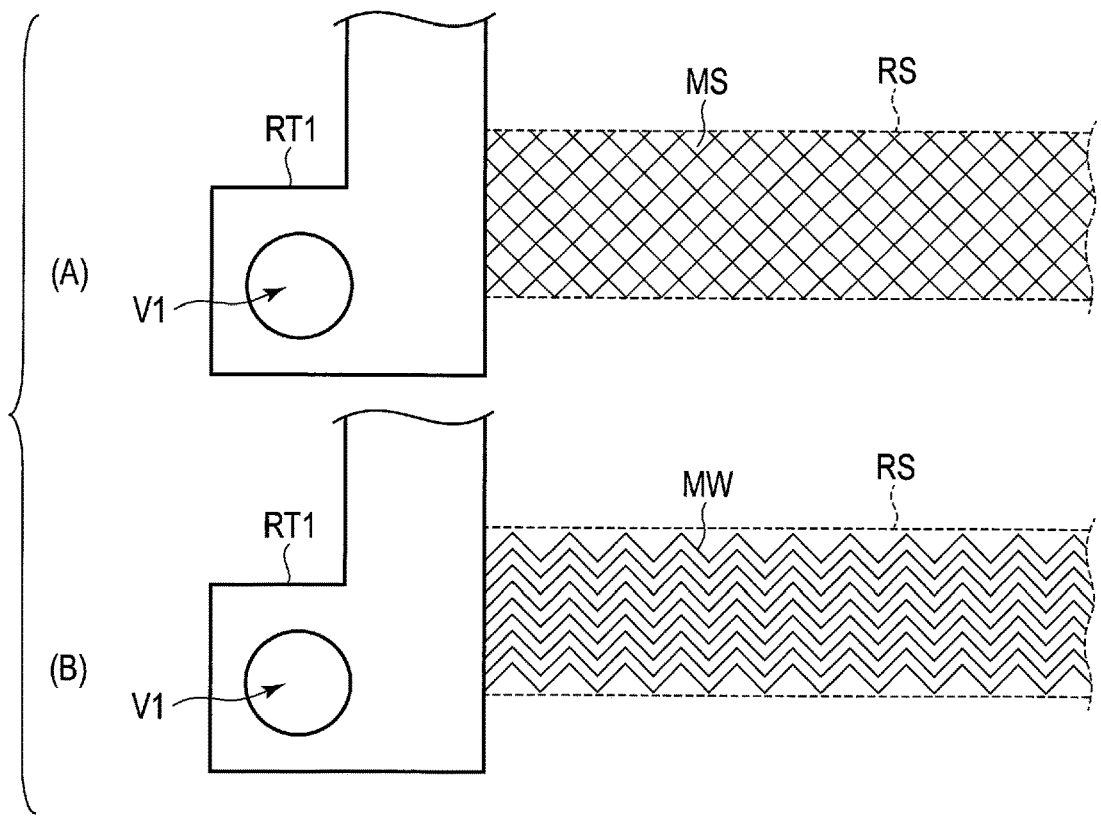
FIG. 3 is a plan view showing a configuration example of a detector according to the embodiment.

In general, according to one embodiment, there is provided a display device comprising a first substrate, a second substrate and an adhesive layer. The first substrate comprises a plurality of drive electrodes arranged at a first intervals in a first direction. The second substrate is opposed to the first substrate and comprises a plurality of detection electrodes arranged at a second intervals in a second direction perpendicular to the first direction. The adhesive layer bonds the first substrate and the second substrate together. A first detection electrodes of the detection electrodes are shaped in accordance with a shape of a display area which displays an image.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a plan view showing a configuration example of a display device DSP of the present embodiment. As an example of the display device DSP, a liquid crystal display device equipped with a sensor SS will be described here.

The display device DSP comprises a display panel PNL, an IC chip I1 and a wiring substrate SUB3. The display panel PNL is a liquid crystal display panel and comprises a first substrate SUB1, a second substrate SUB2, a sealant SE and a display function layer (liquid crystal layer LC which will be described later). The second substrate SUB2 is opposed to the first substrate SUB1. The sealant SE corresponds to a portion indicated by diagonal lines in FIG. 1, and bonds the first substrate SUB1 and the second substrate SUB2 together and seals in the liquid crystal layer LC.

The display panel PNL comprises a display area DA which displays an image and a frame-shaped non-display area NDA which surrounds the display area DA. The display area DA is surrounded by and located within the sealant SE. The sealant SE is located in the non-display area NDA.

The IC chip I1 is mounted on the wiring substrate SUB3. Unlike in the example illustrated, the IC chip I1 may be mounted on the first substrate SUB1 extending outward beyond the second substrate SUB2 or may be mounted on an external circuit board connected to the wiring substrate SUB3. The IC chip I1 comprises, for example, a built-in display driver DD which outputs signals necessary for image display. Furthermore, in the example illustrated, the IC chip I1 comprises a built-in detection circuit RC which functions as a touch panel controller or the like. Note that the detection circuit RC may be incorporated in an IC chip other than the IC chip I1.

The display panel PNL may be a transmissive display panel having a transmissive display function of displaying an image by selectively transmitting light from below the first substrate SUB1. The display panel PNL may be a reflective display panel having a reflective display function of displaying an image by selectively reflecting light from above the second substrate SUB2. The display panel PNL may be a transflective display panel having both the transmissive display function and the reflective display function.

The sensor SS is configured to perform sensing to detect the contact or approach of an object to the display device DSP. The sensor SS comprises a plurality of detection electrodes Rx (Rx1, Rx2, ...). The detection electrodes Rx are provided in the second substrate SUB2 and correspond to a second conductive layer L2 as will be described later with reference to FIG. 4. The detection electrodes Rx extend in the first direction X and are arranged (at second intervals) and spaced apart in the second direction Y Although detection electrodes Rx1 to Rx4 are illustrated as the detection electrodes Rx in FIG. 1, the detection electrode Rx1 will be taken as an example and an example of the structure will described.

The detection electrode Rx1 comprises detectors RS, a terminal RT1 and a connector CN.

The detectors RS are located in the display area DA and extend in the first direction X. In the detection electrode Rx1, mainly, the detectors RS are used for sensing. In the example illustrated, each detector RS is formed in a strip shape, more specifically, each detector RS is formed of meshed thin metal wires MS as shown in FIG. 3(A). The thin metal wires MS are connected to the terminal RT1. Alternatively, each detector RS is formed of wavy metal wires MW as shown in FIG. 3(B). The thin metal wires MW are formed in a saw-tooth shape in the example illustrated, but the thin metal wires MW may be formed in another shape such as a sine wave shape. The thin metal wires MW are connected to the terminal RT1. The terminal RT1 is formed of, for example, the same material as that of the detectors RS. The detection electrode Rx1 is assumed to comprise two detectors RS here but may comprise three or more detectors RS or one detector RS.

Now, the embodiment will be described with reference to FIG. 1 again. The terminal RT1 is located on one end side of the detection electrode Rx1 and is connected to the detectors RS. The connector CN is located on the other end side of the detection electrode Rx1 and is connected to the detectors RS. In FIG. 1, one end side corresponds to the left side and the other end side corresponds to the right side. A part of the terminal RT1 is formed at a position overlapping the sealant SE in planar view.

On the other hand, the first substrate SUB1 comprises a pad P1 and a wiring line W1 which correspond to a first conductive layer L1 as will be described later with reference to FIG. 4. The pad P1 and the wiring line W1 are located on one end side of the non-display area NDA (the detection electrode Rx1) and overlap the sealant SE in planar view. The pad P1 is formed at a position overlapping the terminal RT1 in planar view. In addition, the pad P1 is formed in a trapezoidal shape in one example but may be formed in another polygonal shape or a circular or elliptical shape. The wiring line W1 is connected to the pad P1, extends in the second direction Y and is electrically connected to the detection circuit RC of the IC chip I1 via the wiring substrate SUB3.

A contact hole V1 is formed at a position at which the terminal RT1 and the pad P1 are opposed to each other. In addition, the contact hole V1 penetrates the second substrate SUB2 including the terminal RT1 and the sealant SE and may also penetrate the pad P1 in some cases. In the example illustrated, the contact hole V1 has a circular shape in planar view. However, the shape is not limited to that of the example illustrated and may be another shape such as an elliptical shape. As will be described later with reference to FIG. 4, a connecting material C is provided in the contact hole V1. As a result, the terminal RT1 and the pad P1 are electrically connected to each other. More specifically, the detection electrode Rx1 provided in the second substrate SUB2 is electrically connected to the detection circuit RC via the wiring substrate SUB3 connected to the first substrate SUB1. The detection circuit RC reads sensor signals output from the detection electrodes Rx and detects the presence or absence of contact or approach of an object, the position coordinates of an object, and the like.

In the example illustrated, terminals RT1, RT3, ... of odd-numbered detection electrodes Rx1, Rx3, ..., pads P1, P3, ..., wiring lines W1, W3, ..., and contact holes V1, V3, ... are located on one end side of the non-display area NDA. In addition, terminals RT2, RT4, ... of even-numbered detection electrodes Rx2, Rx4, ..., pads P2, P4, ..., wiring lines W2, W4, ..., and contact holes V2, V4, ... are located on the other end side of the non-display area NDA. According to this layout, the width of one end side and the width of the other end side in the non-display area NDA can be made uniform, and this is suitable for making the frame narrow.

FIG. 2 is a cross-sectional view showing the structure of a part of the display panel PNL shown in FIG. 1. The figure here shows a cross-sectional view of the display device DSP taken in the first direction X.

The illustrated display panel PNL has a configuration corresponding to a display mode which mainly uses a lateral electric field substantially parallel to the surface of a substrate. The display panel PNL may have a configuration corresponding to a display mode which uses a longitudinal electric field perpendicular to the surface of a substrate, an oblique electric field inclined with respect to the surface of a substrate, or a combination of these electric fields. In the display mode using the lateral electric field, for example, the display panel PNL may comprise both a pixel electrode PE and a common electrode CE in one of the first substrate SUB1 and the second substrate SUB2. In the display mode using the longitudinal electric field or oblique electric field, for example, the display panel PNL may comprise one of a pixel electrode PE and a common electrode CE in the first substrate SUB1 and the other one of the pixel electrode PE and the common electrode CE in the second substrate SUB2. Note that the surface of a substrate here is a surface parallel to the X-Y plane.

The first substrate SUB1 comprises a first glass substrate 10, signal lines S, a common electrode CE, a metal layer M, a pixel electrode PE, a first insulating film 11, a second insulating film 12, a third insulating film 13, a first alignment film AL1 and the like. Switching elements, scanning lines, various insulating films interposed between them and the like are not illustrated in the drawing.

The first insulating film 11 is located on the first glass substrate 10. The scanning line and a semiconductor layer of the switching element which are not illustrated in the drawing are located between the first glass substrate 10 and the first insulating film 11. The signal lines S are located on the first insulating film 11. The second insulating film 12 is located on the signal lines S and the first insulating film 11. The common electrode CE is located on the second insulating film 12. The metal layer M is in contact with the common electrode CE directly above the signal lines S. The metal layer M is located on the common electrode CE in the example illustrated but may be located between the common electrode CE and the second insulating film 12. The third insulating film 13 is located on the common electrode CE and the metal layer M. The pixel electrode PE is located on the third insulating film 13. The pixel electrode PE is opposed to the common electrode CE via the third insulating film 13. In addition, the pixel electrode PE has a slit SL at a position opposed to the common electrode CE. The first alignment film AL1 covers the pixel electrode PE and the third insulating film 13.

The scanning lines, the signal lines S and the metal layer M are formed of a metal material such as molybdenum, tungsten, titanium or aluminum and may have a single-layer structure or a multilayer structure. The common electrode CE and the pixel electrode PE are formed of a transparent conductive material such as ITO or IZO. The first insulating film 11 and the third insulating film 13 are inorganic insulating films, and the second insulating film 12 is an organic insulating film.

The configuration of the first substrate SUB1 is not limited to that of the example illustrated, and the pixel electrode PE may be located between the second insulating film 12 and the third insulating film 13 and the common electrode CE may be located between the third insulating film 13 and the first alignment film AL1. In that case, the pixel electrode PE is formed in a flat plate shape having no slit and the common electrode CE has a slit opposed to the pixel electrode PE. Alternatively, both the pixel electrode PE and the common electrode CE may be formed in a comb-tooth shape and may be arranged so as to be engaged with each other.

The second substrate SUB2 comprises a second glass substrate 20, a light-shielding layer BM, color filters CF, an overcoat layer OC, a second alignment film AL2 and the like.

The light-shielding layer BM and the color filters CF are located on one side of the second glass substrate 20 which is opposed to the first substrate SUB1. The light-shielding layer BM delimits pixels and is located directly above the signal lines S. The color filter CF is opposed to the pixel electrode PE and partially overlaps the light-shielding layer BM. The color filters CF include a red color filter, a green color filter, a blue color filter and the like. The overcoat layer OC covers the color filters CF. The second alignment film AL2 covers the overcoat layer OC.

Note that the color filters CF may be arranged in the first substrate SUB1. The color filters CF may include four or more color filters. For a pixel which displays white, a white color filter or an uncolored resin material may be arranged or the overcoat layer OC may be arranged without any color filter.

The detection electrode Rx is located on a surface 20B of the second glass substrate 20. The detection electrode Rx corresponds to the second conductive layer L2 as described above, and may be formed of a conductive layer including metal or a transparent conductive material such as ITO or IZO, may be formed of a multilayer of a conductive layer including metal and a transparent conductive layer disposed thereon, or may be formed of a conductive organic material, a dispersing element of a fine conductive substance or the like.

A first optical element OD1 including a first polarizer PL1 is located between the first glass substrate 10 and an illumination device BL. A second optical element OD2 including a second polarizer PL2 is located on the detection electrode Rx. Each of the first optical element OD1 and the second optical element OD2 may include a retardation film as needed.

Figure 4:
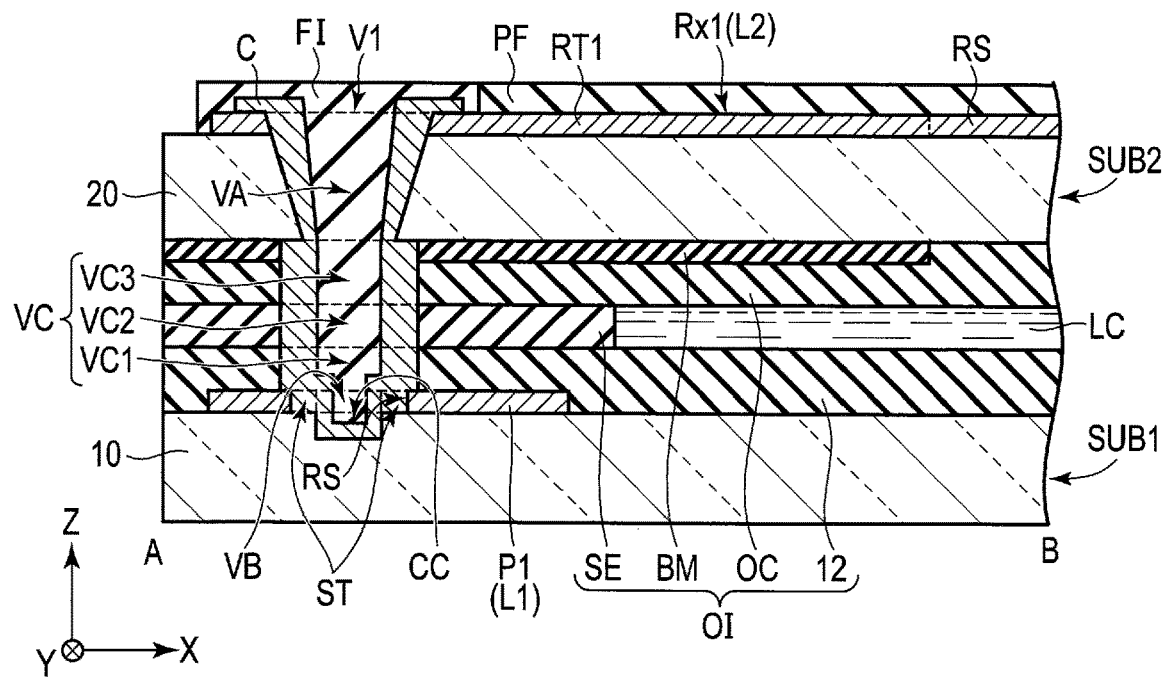
FIG. 4 is a cross-sectional view showing a configuration example of the display panel taken along line A-B shown in FIG. 1.

FIG. 4 is a cross-sectional view showing a configuration example of the display panel PNL taken along line A-B including the contact hole V1 shown in FIG. 1. Only the main portions necessary for explanation are illustrated in the drawing.

The first substrate SUB1 comprises the first glass substrate 10, the pad P1 corresponding to the first conductive layer L1, the second insulating film 12 corresponding to an organic insulating film OI, and the like. The first insulating film 11 which is not illustrated in the drawing or other insulating films or other conductive layers may be provided between the first glass substrate 10 and the pad P1 and between the first glass substrate 10 and the second insulating film 12.

The second substrate SUB2 comprises the second glass substrate 20, the detection electrode Rx1 corresponding to the second conductive layer L2, the light-shielding layer BM and the overcoat layer OC corresponding to organic insulating films OI, and the like. At least the detectors RS and the terminal RT1 of the detection electrode Rx1 are partially covered with a protection film PF. The protection film PF is formed of, for example, an organic insulating material such as acrylic resin.

The sealant SE corresponds to an organic insulating film OI and is located between the second insulating film 12 and the overcoat layer OC. A liquid crystal layer LC is located between the first substrate SUB1 and the second substrate SUB2. Although not illustrated in the drawing, the metal layer M, the third insulating film 13 and the first alignment film AL1 shown in FIG. 2 may be interposed between the second insulating layer 12 and the sealant SE. Furthermore, the second alignment film AL2 shown in FIG. 2 may be interposed between the overcoat layer OC and the sealant SE.

The contact hole V1 includes a through hole VA penetrating the second glass substrate 20 and the terminal RT of the detection electrode Rx, a through hole VB penetrating the pad P1, a through hole VC penetrating the organic insulating films OI, and a concavity CC formed in the first glass substrate 10. The through hole VC includes a first hole VC1 penetrating the second insulating film 12, a second hole VC2 penetrating the sealant SE, and a third hole VC3 penetrating the light-shielding layer BM and the overcoat layer OC. When the first alignment film AL1 is interposed between the sealant SE and the second insulating film 12, the first hole VC1 also penetrates the first alignment film AL1. When the second alignment film AL2 is interposed between the sealant SE and the overcoat layer OC, the third hole VC3 also penetrates the second alignment film AL2. The first hole VC1, the second hole VC2 and the third hole VC3 are arranged in this order in the third direction Z. The second hole VC2 is continuous with the first hole VC1 and the third hole VC3.

The connecting material C is provided in the contact hole V1 and electrically connects the pad P1 and the detection electrode Rx. A hollow in the connecting material C is filled with an insulating filling material FI. Members which are in contact with the connecting material C in the contact hole V1 will be more specifically described. That is, the connecting material C is in contact with each of the terminal RT1 and the second glass substrate 20 in the through hole VA. Furthermore, the connecting material C is in contact with each of the light-shielding layer BM and the overcoat layer OC in the third hole VC3 of the through hole VC, is in contact with the sealant SE in the second hole VC2 of the through hole VC, and is also in contact with the second insulating film 12 in the first hole VC1 of the through hole VC. Furthermore, the connecting material C is in contact with the pad P1 in the through hole VB and is in contact with the first glass substrate 10 in the concavity CC. In the example illustrated, since the pad P1 is provided with a slit ST, the connecting material C is also in contact with a side surface PS of the pad P1 in the slit ST. Therefore, as compared to a case where the pad P1 is not provided with the slit ST, the area of contact between the pad P1 and the connecting material C can be increased.

According to the display device DSP comprising the above-described sensor SS, the detection electrode Rx provided in the second substrate SUB2 is connected to the pad P provided in the first substrate SUB1 by the connecting material C provided in the contact hole V Therefore, it is unnecessary to mount a wiring substrate which connects the detection electrode Rx and the detection circuit RC on the second substrate SUB2. That is, the wiring substrate SUB3 mounted on the first substrate SUB1 forms a transmission path for transmitting a signal necessary for displaying an image on the display panel PNL and also forms a transmission path for transmitting a signal between the detection electrode Rx and the detection circuit RC. Therefore, as compared to a configuration example which requires a wiring substrate separately from the wiring substrate SUB3, the number of wiring substrates can be reduced and the cost can be reduced. In addition, since the space to connect the wiring substrate and the second substrate SUB2 is not required, the non-display area of the display panel PNL, in particular, the width of an end side on which the wiring substrate SUB3 is mounted can be reduced. As a result, the frame can be narrowed and the cost can be reduced.

An example of a mutual-capacitive sensing operation will be described with reference to the timing chart of FIG. 5. Here, the display device DSP is assumed to comprise n drive electrodes Tx. The drive electrode Tx includes the above-described common electrode CE and has the function of producing an electric field between the drive electrode Tx and the pixel electrode PE and has the function of detecting the position of an object by producing a capacitance between the drive electrode Tx and the detection electrode Rx.

In this case, sensing is performed for every two bundles in the first and last touch detection periods in one touch frame period, and sensing is performed for every three bundles in the other touch detection periods. At this time, sensing is performed such that the drive electrodes Tx partially overlap each other. That is, as shown in FIG. 5, the drive electrodes Tx1 and Tx2 are driven in the first touch detection period in one touch frame period, and the drive electrodes Tx2 to Tx4 are driven in the next touch detection period. Furthermore, the drive electrodes Tx(N−5) to Tx(N−3) are drive in a predetermined touch detection period, the drive electrodes Tx(N−3) to Tx(N−1) are driven in the touch detection period after the predetermined touch detection period, and the drive electrodes Tx(N−1) and TxN are driven in the last touch detection period.

Differences between a generally-used display device and the display device of the present embodiment will be described with reference to FIGS. 6 to 9. Note that only the main portions necessary for explanation are illustrated in FIGS. 6 to 9. Furthermore, it is assumed in FIGS. 6 to 9 that the terminals RT1, RT3, . . . corresponding to the odd-numbered detection electrodes Rx1, Rx3, . . . are provided on one end side of the non-display area NDA (on the left side of the drawing) and the terminals RT2, RT4, . . . corresponding to the even-numbered detection electrodes Rx2, Rx4, . . . are provided on the other end side of the non-display area NDA (on the right side of the drawing). However, the contact holes V provided in the respective terminals RT are not illustrated in FIGS. 6 to 9.

FIG. 6 is a plan view showing a generally-used display device. In the generally-used display device, as shown in FIG. 6, both the first substrate SUB1 and the second substrate SUB2 have a rectangular shape and the display area DA also has a rectangular shape. Furthermore, the detection electrode Rx is composed of the detectors RS which linearly extend in the first direction X, the terminal RT which electrically connects a conductive layer on the first substrate SUB1 side and a conductive layer on the second substrate SUB2 side, and the connector CN which linearly extends in the second direction Y and connects the detectors RS, and the detection electrode Rx has a hollow rectangular shape as shown in FIG. 6.

Figure 7:
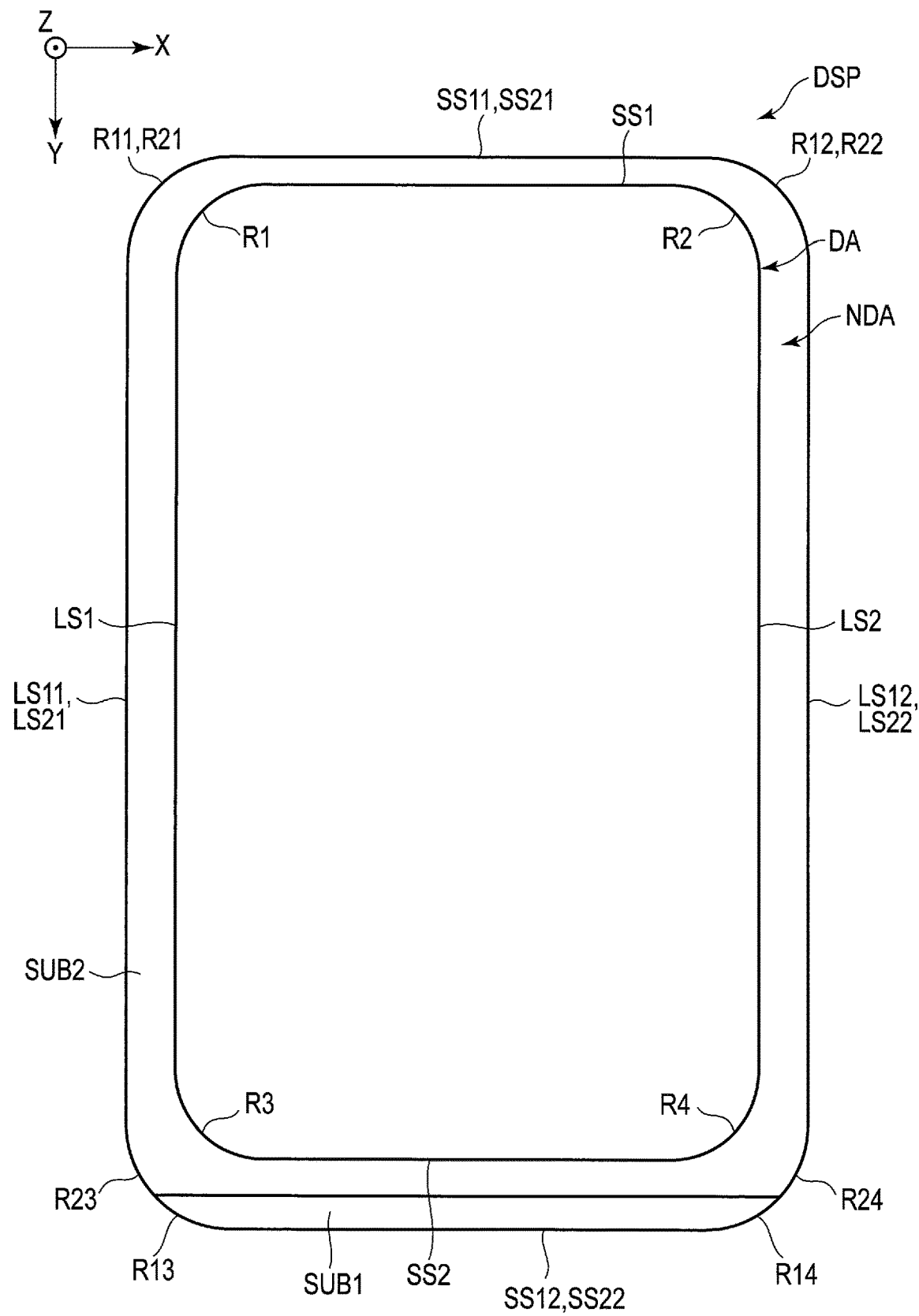
FIG. 7 is a plan view showing the external appearance of the display device according to the embodiment.

On the other hand, in the display device DSP of the present embodiment, as shown in FIG. 7, the first substrate SUB1 includes a pair of short sides SS11 and SS12 which extend in the first direction X, a pair of long sides LS11 and SL12 which extend in the second direction Y, and four round portions R11 to R14. Furthermore, the second substrate SUB2 includes a short side SS21 which overlaps the short side S11, long sides LS21 and LS22 which overlap the long sides LS11 and LS12, respectively, round portions R21 and R22 which overlap the round portions R11 and R12, respectively, round portions R23 and R24, and a short side S22. The short side S22 does not overlap the short side SS12. More specifically, the round portion R23 connects the short side SS22 and the long side LS21, the round portion R24 connects the short side SS22 and the long side LS22, the round portion R23 is curved so as to partially overlap the round portion R13, and the round portion R24 is curved so as to partially overlap the round portion R14.

Furthermore, the display area DA includes a pair of short sides SS1 and SS2 which extend in the first direction X, a pair of long sides LS1 and LS2 which extend in the second direction Y, and four round portions R1 to R4. The short sides SS1 and SS2 and the long sides LS1 and LS2 correspond to linear portions which connect the round portions which are adjacent to each other. More specifically, the radii of curvature which define the round portions R indicating the boundary of the display area DA and the radii of curvature which define the round portions R of the first substrate SUB1 and the second substrate SUB2 may match each other between the corresponding round portions R or may differ from each other.

The shape of the display device DSP of the present embodiment in which the first substrate SUB1 includes the round portions R11 to R14, the second substrate SUB2 includes the round portions R21 to R24 and the display area DA includes the round portions R1 to R4 will be hereinafter referred to as a round shape.

Figure 8:
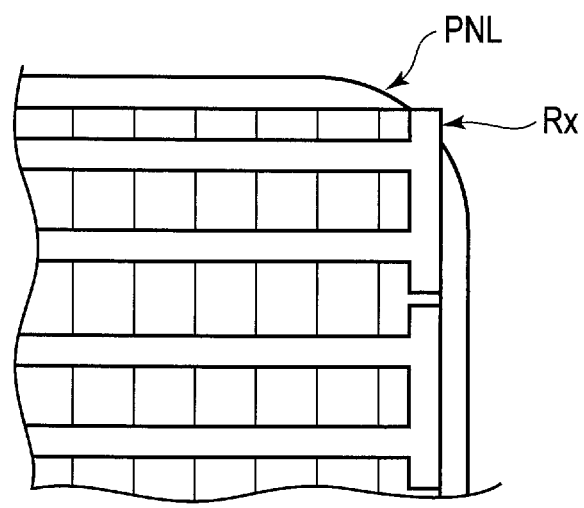
FIG. 8 is an illustration showing a case where the display device according to the embodiment is equipped with a generally-used sensor.

When the display device DSP has a round shape as described above, if the detection electrode Rx is maintained in the hollow rectangular shape shown in FIG. 6, the detection electrode Rx does not fit into the display panel PNL as shown in FIG. 8.

Figure 9:
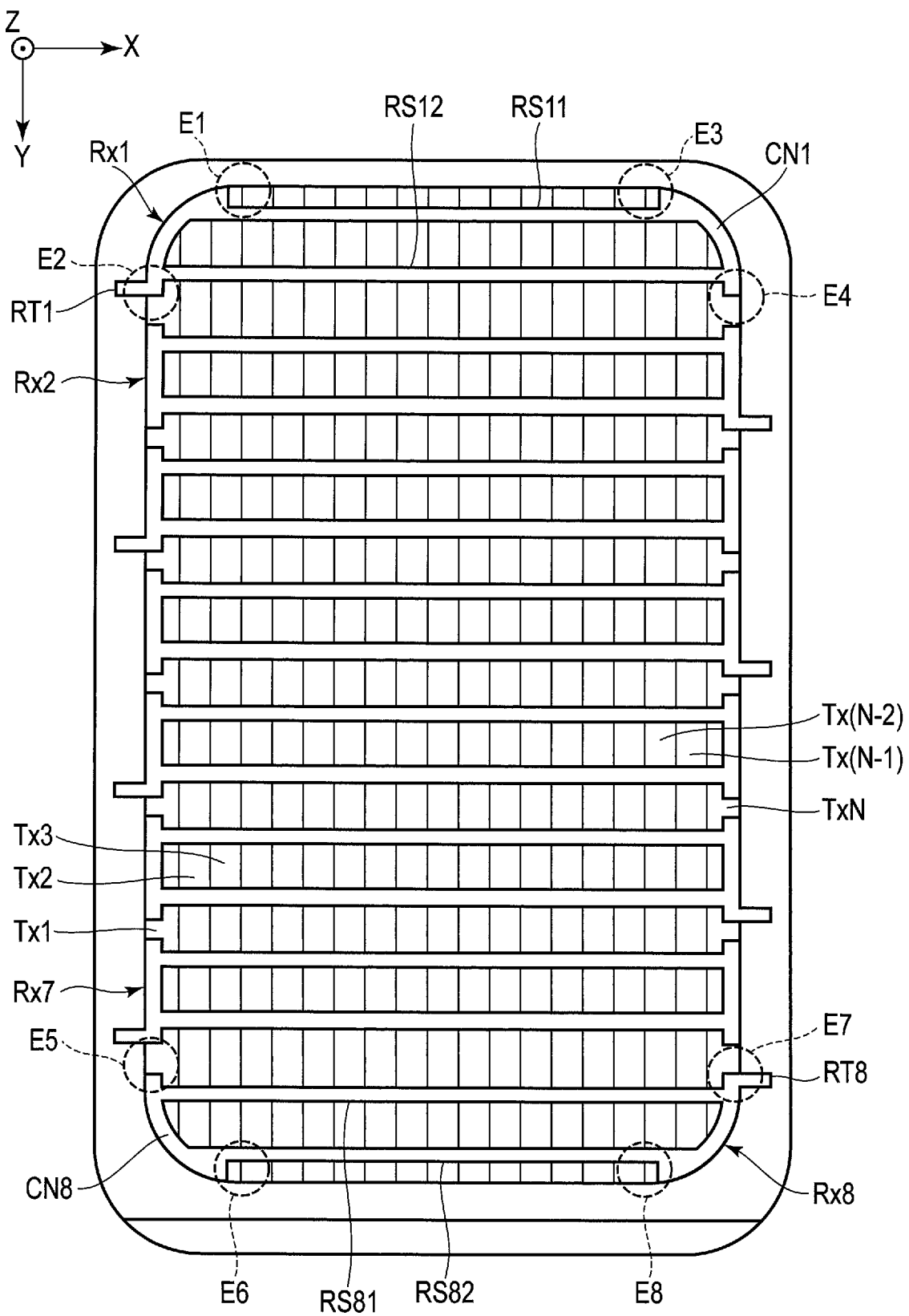
FIG. 9 is another plan view showing a configuration example of the display device according to the embodiment.

Therefore, in the present embodiment, as shown in FIG. 9, a part of the detection electrode Rx is shaped in accordance with the shape of the display area DA (the shapes of the first substrate SUB1 and the second substrate SUB2) as a way of solving this problem. More specifically, as shown in FIG. 9, the first detection electrode Rx1 and the last detection electrode Rx8 of the large number of detection electrodes Rx arranged in the second direction Y are shaped in accordance with the shape of the display area DA as a way of solving this problem.

The detection electrode Rx1 includes a detector RS11, a detector RS12, a terminal RT1 and a connector CN1. The detector RS11 is located in the display area DA and extends in the first direction X. The detector RS12 is located in the display area DA, extends parallel to the detector RS11 and is longer than the detector RS11 in the first direction X. The terminal RT1 is located on one end side of the non-display area NDA. The connector CN1 connects the detectors RS11 and RS12. The terminal RT1 is curved with the same radius of curvature as the radius of curvature which defines the above-described round portion R1. The terminal RT1 is continuous with the detectors RS11 and RS12. The terminal RT1 electrically connects a conductive layer on the first substrate SUB1 side and a conductive layer on the second substrate SUB2 side in the contact hole V1 which is not illustrated in the drawing. The connector CN1 is curved with the same radius of curvature as the radius of curvature which defines the above-described round portion R2, and connects the detectors RS11 and RS12. Although the terminal RT1 is assumed to be curved with the same radius of curvature as the radius of curvature which defines the round portion R1, the terminal RT1 may be curved with a different radius of curvature from the radius of curvature which defines the round portion R1. Similarly, the connector CN1 may be curved with a different radius of curvature from the radius of curvature which defines the round portion R2.

When the drive method of driving the large number of drive electrodes Tx arranged (at first intervals) in the first direction X is the drive method of driving the drive electrodes Tx for every two bundles only at the beginning and at the end and driving the other drive electrodes Tx for every three bundles as shown in FIG. 5, one end portion E1 of the terminal RT1 extends in the first direction X so as to partially overlap a drive electrode adjacent to the first two bundles of drive electrodes Tx, that is, the drive electrode Tx3. Furthermore, the other end portion E2 of the terminal RT1 extends in the second direction Y, not to the extent of being continuous with the detection electrode Rx2 which is adjacent in the second direction Y One end portion E3 of the connector CN1 extends in the first direction X so as to partially overlap a drive electrode adjacent to the last two bundles of drive electrodes Tx, that is, the drive electrode Tx(N−2). Furthermore, the other end portion E4 of the connector CN1 extends in the second direction Y, not to the extent of being continuous with the adjacent detection electrode Rx2, as is the case with the end portion E2 of the terminal RT1.

As is the case with the detection electrode Rx1, the detection electrode Rx8 includes a detector RS81 which is located in the display area DA and extends in the first direction X, a detector RS82 which is located in the display area DA, extends parallel to the detector RS81 and is shorter than the detector RS81, a terminal RT8 which is located on the other end side of the non-display area NDA, and a connector CN8 which connects the detectors RS81 and RS82. The terminal RT8 is curved with the same radius of curvature as the radius of curvature which defines the above-described round portion R4, is continuous with the detectors RS81 and RS82, and electrically connects a conductive layer on the first substrate SUB1 side and a conductive layer on the second substrate SUB2 side in a contact hole V8 which is not illustrated in the drawing. The connector CN8 is curved with the same radius of curvature as the radius of curvature which defines the above-described round portion R3, and connects the detectors RS81 and RS82. Although the terminal RT8 is assumed to be curved with the same radius of curvature as the radius of curvature which defines the round portion R4, the terminal RT8 may be curved with a different radius of curvature from the radius of curvature which defines the round portion R4. Similarly, the connector CN8 may be curved with a different radius of curvature from the radius of curvature which defines the round portion R3.

One end portion E5 of the connector CN8 extends in the second direction Y, not to the extent of being continuous with the adjacent detection electrode Rx7. Furthermore, the other end portion E6 of the connector CN8 extends in the first direction X so as to partially overlap the drive electrode Tx3 adjacent to the first two bundles of drive electrodes Tx as is the case with the end portion E1 of terminal RT1. One end portion E7 of the terminal RT8 extends in the second direction Y, not to the extent of being continuous with the adjacent detection electrode Rx7, as is the case with the end portion E5 of the connector CN8. Furthermore, the other end portion E8 of the terminal RT8 extends in the first direction X so as to partially overlap the drive electrode Tx(N−2) adjacent to the last two bundles of drive electrodes Tx as is the case with the end portion E3 of the connector CN1.

As described above, even if the shape of the display device DSP is a round shape, it becomes possible to fit the detection electrode Rx into the display panel PNL by shaping the first detection electrode Rx1 and the last detection electrode Rx8 of the large number of detection electrodes Rx arranged in the second direction Y in accordance with the shape of the display area DA.

When a notch is formed in the display panel PNL, detection electrodes Rx close to the notch may be shaped in accordance with the shape of the notch. More specifically, detection electrodes Rx may be cut off (disconnected) in the notch NT as shown in FIG. 10. Since the notch NT is generally provided for the purpose of mounting a camera or the like, it is unnecessary to detect the presence or absence of the contact or approach of an object in the notch NT. Alternatively, detection electrodes Rx may be provided in the non-display area NDA, for example, in a curved shape in accordance with the shape of the notch NT as shown in FIG. 11. It becomes possible to secure redundancy by connecting the right and left detection electrodes Rx via the non-display area NDA as shown in FIG. 11. Note that the number and positions of notches NT are arbitrarily determined.

[Modification]

Next, a modification will be described.

Figure 12:
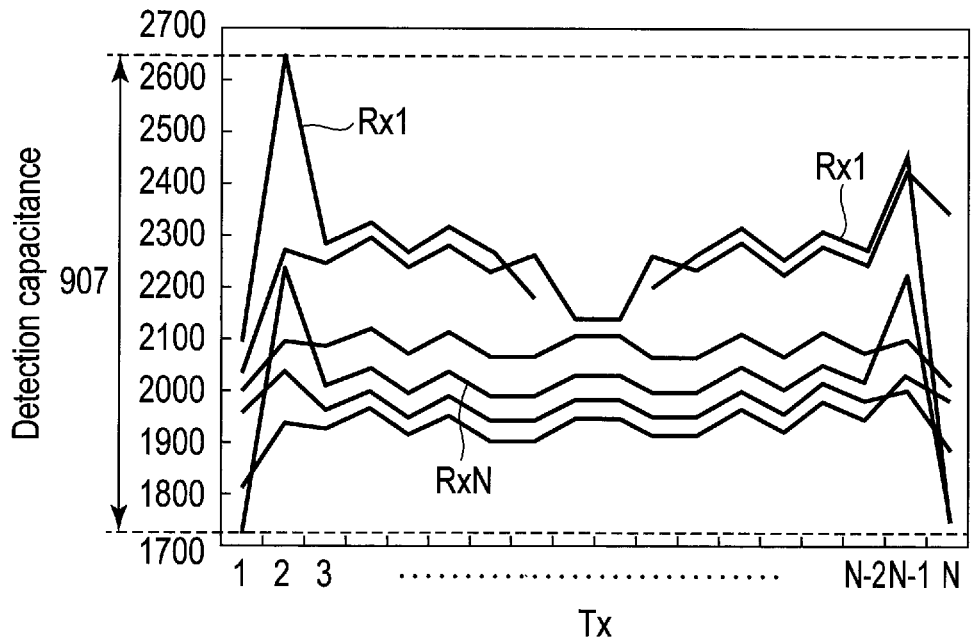
FIG. 12 is a graph showing an example of a detection capacitance between a drive electrode and a detection electrode when an object does not contact or approach the display device according to the embodiment.

Firstly, a detection capacitance in a case where detection electrodes Rx are shaped in accordance with the shape of the display area DA as shown in FIG. 9 will be described. FIG. 12 is a graph showing a detection capacitance between each drive electrode Tx and each detection electrode Rx when an object does not contact or approach the display device DSP comprising detection electrodes Rx which are shaped as shown in FIG. 9. In this case, as shown in FIG. 12, the difference between the maximum value and the minimum value of the detection capacitance is 907, and a new problem arises, that is, the detection capacitance varies (the detection capacitance becomes nonuniform).

Figure 13:
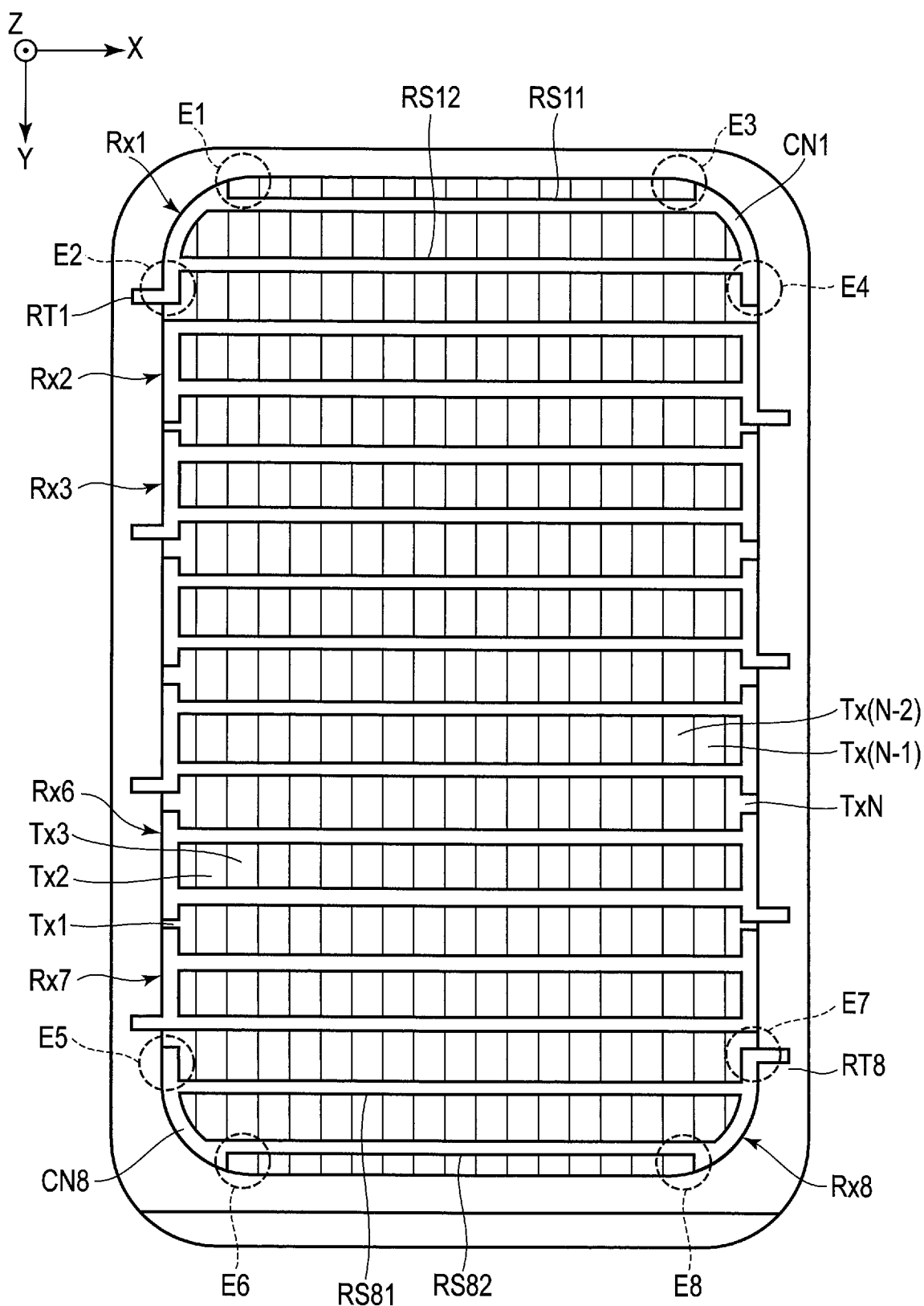
FIG. 13 is a plan view showing a configuration example of a display device according to a modification of the embodiment.

In the present modification, detection electrodes Rx are shaped as shown in FIG. 13 as a way of solving this problem.

FIG. 13 is a plan view showing a display device DSP according to the present modification.

In FIG. 9, one end portion E1 of the terminal RT1 of the detection electrode Rx1 extends in the first direction X so as to partially overlap the drive electrode Tx3. However, in the present modification, one end portion E1 of the terminal RT1 of the detection electrode Rx1 extends in the first direction X to the end portion of the drive electrode Tx2 and is cut off before the drive electrode Tx3 (that is, at the boundary between the drive electrode Tx2 and the drive electrode Tx3) as shown in FIG. 13. Furthermore, the other end portion E2 of the terminal RT1 of the detection electrode Rx1 extends farther in the second direction Y as compared to the case shown in FIG. 9. More specifically, the end portion E2 becomes longer as the end portion E1 becomes shorter.

Similarly, one end portion E3 of the connector CN1 of the detection electrode Rx1 extends in the first direction X to the end portion of the drive electrode Tx(N−1) and is cut off before the drive electrode Tx(N−2) (that is, at the boundary between the drive electrode Tx(N−2) and the drive electrode Tx(N−1)). Furthermore, the other end portion E4 of the connector CN1 of the detection electrode Rx1 extends in the second direction Y such that the end portion E4 becomes longer as the end portion E3 becomes shorter.

Furthermore, in the present modification, since the length of the end portion E2 of the terminal RT1 and the length of the end portion E4 of the connector CN1 of the detection electrode Rx1 are extended in the second direction Y, the shape of the detection electrode Rx2 adjacent to the detection electrode Rx1 is also changed as shown in FIG. 13. More specifically, the connector CN2 and the terminal RT2 of the detection electrode Rx2 become shorter on the detection electrode Rx1 side and become longer on the detection electrode Rx3 side. More specifically, the connector CN2 and the terminal RT2 of the detection electrode Rx2 become longer on the detection electrode Rx3 side as the connector CN2 and the terminal RT2 of the detection electrode Rx2 become shorter on the detection electrode Rx1 side.

In the detection electrode Rx8 also, one end portion E6 of the connector CN8 of the detection electrode Rx8 extends in the first direction X to the end portion of the drive electrode Tx2 and is cut off before the drive electrode Tx3. Furthermore, the other end portion E5 of the connector CN8 of the detection electrode Rx8 extends in the second direction Y such that the end portion E5 becomes longer as the end portion E6 becomes shorter.

Furthermore, one end portion E8 of the terminal RT8 of the detection electrode Rx8 extends in the first direction X to the end portion of the drive electrode Tx(N−1) and is cut off before the drive electrode Tx(N−2). Furthermore, the other end portion E7 of the terminal RT8 of the detection electrode Rx8 extends in the second direction Y such that the end portion E7 becomes longer as the end portion E8 becomes shorter.

Furthermore, since the length of the end portion E5 of the connector CN8 and the length of the end portion E7 of the terminal RT8 of the detection electrode Rx8 are extended in the second direction Y, the shape of the detection electrode Rx7 adjacent to the detection electrode Rx8 is also changed as shown in FIG. 13. More specifically, the terminal RT7 and the connector CN7 of the detection electrode Rx7 become shorter on the detection electrode Rx8 side and become longer on the detection electrode Rx6 side. More specifically, the terminal RT7 and the connector CN7 of the detection electrode Rx7 become shorter on the detection electrode Rx8 side as the terminal RT7 and the connector CN7 of the detection electrode Rx7 become longer on the detection electrode Rx6 side.

Figure 14:
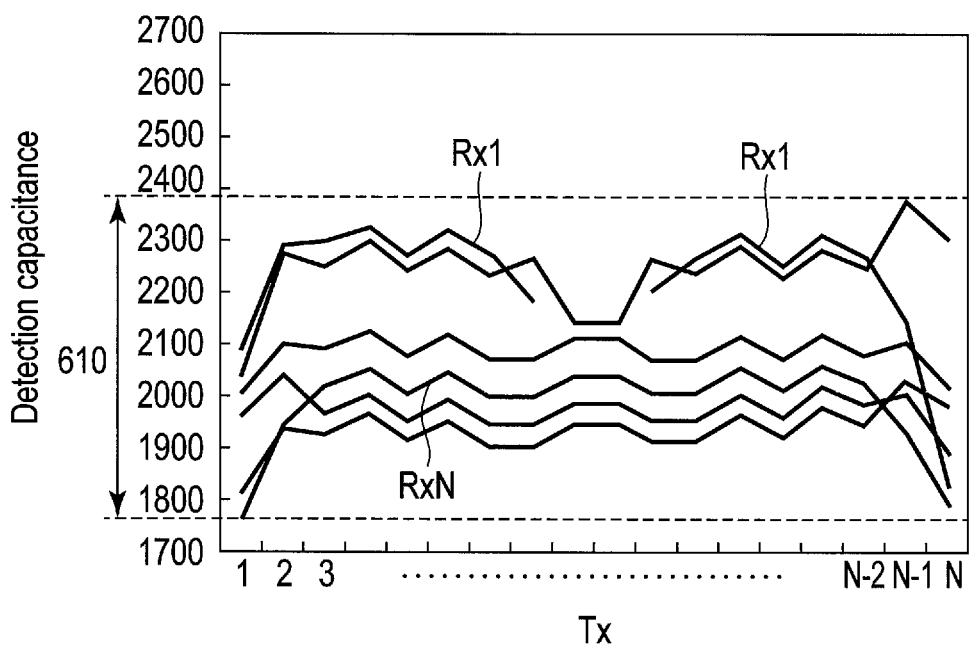
FIG. 14 is a graph showing an example of a detection capacitance between a drive electrode and a detection electrode when an object does not contact or approach the display device according to the modification of the embodiment.

FIG. 14 shows a detection capacitance in a case where detection electrodes Rx are shaped as shown in FIG. 13. In this case, the difference between the maximum value and the minimum value is 610 and variations are reduced as compared to the case shown in FIG. 12. In other words, the detection capacitance becomes less nonuniform. As a result, the SN ratio is expected to be improved.

The present embodiment has been described based on the assumption that a conductive layer on the first substrate SUB1 side and a conductive layer on the second substrate SUB2 side are electrically connected to each other via the contact hole V as a configuration example of the display device DSP. However, the configuration of the display device DSP is not limited to this, but a wiring substrate which connects the detection electrode Rx and the detection circuit RC may be mounted on the second substrate SUB2.

As described above, according to the present embodiment, a display device with a narrower frame can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device comprising:
   a first substrate comprising a plurality of drive electrodes arranged at a first intervals in a first direction;
   a second substrate opposed to the first substrate and comprising a plurality of detection electrodes arranged at a second intervals in a second direction perpendicular to the first direction; and
   an adhesive layer which bonds the first substrate and the second substrate together, wherein
   a first detection electrodes of the detection electrodes are shaped in accordance with a shape of a display area which displays an image,
   wherein
   each of the detection electrodes comprises a plurality of detectors which extend in the first direction and detect presence or absence of contact or approach of an object, a terminal comprising a contact hole which electrically connects a conductive layer on a first substrate side and a conductive layer on a second substrate side, and a connector which connects the detectors to each other,
   the display area comprises a pair of first sides which extend in the first direction, a pair of second sides which extend in the second direction, and round portions which are curved and connect the first sides and the second sides, respectively,
   the first detection electrodes are adjacent to the first sides, respectively, each of the first detection electrodes comprises the terminal and the connector which are curved along the round portions, respectively, and at least one of the terminal and the connector is curved with a same radius of curvature as a radius of curvature of the round portion.

2. The display device of claim 1, wherein one end of the terminal and one end of the connector provided in the first detection electrode each extend in the first direction from a first drive electrode of the drive electrodes which is adjacent to the second side to a part of a second drive electrode, and other end of the terminal and other end of the connector each extend in the second direction for a first distance, not to an extent of being continuous with a detection electrode which is adjacent to the first detection electrode.

3. The display device of claim 1, wherein one end of the terminal and one end of the connector provided in the first detection electrode each extend in the first direction from a first drive electrode of the drive electrodes which is adjacent to the second side to a boundary between a second drive electrode and a third drive electrode adjacent to the second drive electrode, and other end of the terminal and other end of the connector each extend in the second direction for a second distance, not to an extent of being continuous with a detection electrode which is adjacent to the first detection electrode.

4. A display device comprising:

a first substrate comprising a plurality of drive electrodes arranged at a first intervals in a first direction;

a second substrate opposed to the first substrate and comprising a plurality of detection electrodes arranged at a second intervals in a second direction perpendicular to the first direction; and an adhesive layer which bonds the first substrate and the second substrate together, wherein a first detection electrodes of the detection electrodes are shaped in accordance with a shape of a display area which displays an image, wherein each of the detection electrodes comprises a plurality of detectors which extend in the first direction and detect presence or absence of contact or approach of an object, a terminal having a contact hole which electrically connects a conductive layer on a first substrate side and a conductive layer on a second substrate side, and a connector which connects the detectors to each other, the display area comprises a pair of first sides which extend in the first direction, a pair of second sides which extend in the second direction, and round portions which are curved and connect the first sides and the second sides, respectively, the first detection electrodes are adjacent to the first sides, respectively, and a second drive electrode corresponds to an (n−1)th drive electrode from a first drive electrode, in a drive method of collectively driving drive electrodes for every n−1 drive electrodes only at a beginning and at an end and collectively driving drive electrodes for every n drive electrodes in other portion.

5. The display device of claim 4, wherein the detectors provided in each of the first detection electrodes comprise a first detector and a second detector which extend in the first direction, the first detector is adjacent to the first side in the second direction, the second detector is adjacent to the first detector in the second direction, and the first detector is shorter than the second detector in the first direction.

6. The display device of claim 4, wherein the display area comprises a notch, and the first detection electrode is shaped so as to be disconnected in the notch.

7. The display device of claim 4, wherein the display area comprises a notch, and the first detection electrode is shaped in accordance with a shape of the notch in the notch.

8. A display device comprising:

a first substrate comprising a plurality of drive electrodes arranged at a first intervals in a first direction;

a second substrate opposed to the first substrate and comprising a plurality of detection electrodes arranged at a second intervals in a second direction perpendicular to the first direction; and an adhesive layer which bonds the first substrate and the second substrate together, wherein the second substrate comprises a detection circuit which detects presence or absence of contact or approach of an object based on signals output from the detection electrodes, and a wiring substrate which electrically connects the detection electrodes and the detection circuit, and a first electrodes of the detection electrodes are shaped in accordance with a shape of a display area which displays an image, wherein each of the detection electrodes comprises a plurality of detectors which extend in the first direction and output the signals to the detection circuit in accordance with the contact or approach of the object, and a connector which connects the detectors to each other, the display area comprises a pair of first sides which extend in the first direction, a pair of second sides which extend in the second direction, and round portions which are curved and connect the first sides and the second sides, respectively, the first detection electrodes are adjacent to the first sides, respectively, each of the first detection electrodes comprises a connector which is curved along the round portion, and the connector is curved with a same radius of curvature as a radius of curvature of the round portion.

9. The display device of claim 8, wherein one end of the connector provided in the first detection electrode extends in the first direction from a first drive electrode of the drive electrodes which is adjacent to the second side to a part of a second drive electrode, and other end of the connector extends in the second direction for a first distance, not to an extent of being continuous with a detection electrode which is adjacent to the first detection electrode.

10. The display device of claim 8, wherein one end of the connector provided in the first detection electrode extends in the first direction from a first drive electrode of the drive electrodes which is adjacent to the second side to a boundary between a second drive electrode and a third drive electrode adjacent to the second drive electrode, and other end of the connector extends in the second direction for a second distance, not to an extent of being continuous with a detection electrode which is adjacent to the first detection electrode.

11. A display device comprising:

a first substrate comprising a plurality of drive electrodes arranged at a first intervals in a first direction;

a second substrate opposed to the first substrate and comprising a plurality of detection electrodes arranged at a second intervals in a second direction perpendicular to the first direction; and an adhesive layer which bonds the first substrate and the second substrate together, wherein the second substrate comprises a detection circuit which detects presence or absence of contact or approach of an object based on signals output from the detection electrodes, and a wiring substrate which electrically connects the detection electrodes and the detection circuit, and a first electrodes of the detection electrodes are shaped in accordance with a shape of a display area which displays an image, each of the detection electrodes comprises a plurality of detectors which extend in the first direction and output the signals to the detection circuit in accordance with the contact or approach of the object, and a connector which connects the detectors to each other, the display area comprises a pair of first sides which extend in the first direction, a pair of second sides which extend in the second direction, and round portions which are curved and connect the first sides and the second sides, respectively, and the first detection electrodes are adjacent to the first sides, respectively, and a second drive electrode corresponds to an (n−1)th drive electrode from a first drive electrode, in a drive method of collectively driving drive electrodes for every n−1 drive electrodes only at a beginning and at an end and collectively driving drive electrodes for every n drive electrodes in other portion.

12. The display device of claim 11, wherein the detectors provided in each of the first detection electrodes comprise a first detector and a second detector which extend in the first direction, the first detector is adjacent to the first side in the second direction, the second detector is adjacent to the first detector in the second direction, and the first detector is shorter than the second detector in the first direction.

\* \* \* \* \*